Nov. 12, 1935.  H. N. ATWOOD  2,020,759
CONSTRUCTION OF THE TRAILING EDGES OF AEROPLANE WINGS
Filed July 31, 1934

Inventor
Harry N. Atwood.
By Lacey & Lacey,
Attorneys

Patented Nov. 12, 1935

2,020,759

UNITED STATES PATENT OFFICE 2,020,759

CONSTRUCTION OF THE TRAILING EDGES OF AEROPLANE WINGS

Harry N. Atwood, South Lyndeboro, N. H.

Application July 31, 1934, Serial No. 737,340

8 Claims. (Cl. 244—31)

This invention relates to aeroplanes and more particularly to the wings thereof.

The object of the invention is to provide a sustaining wing for aeroplanes, the trailing edge of which is flexible and may be used either as an aileron or elevator, means being provided, operable from the controls of the aeroplane, for flexing said edge when the plane is in flight.

A further object of the invention is to provide a sustaining wing and aileron of integral formation, thus providing a strong unitary structure and dispensing with hinges, pivot bolts and similar fastening devices usually employed for retaining the ailerons in position on the wings, together with their attendant disadvantages.

A further object is to provide an aeroplane wing including a laminated cellular structure encased in a protective jacket, one end of which is extended longitudinally of the trailing edge to form a flexible aileron or elevator, said cellular structure and the material constituting the jacket being intimately united and bonded together so as to impart the desired strength, toughness and stability to the wing.

A still further object of the invention is generally to improve this class of devices so as to increase their utility, durability and efficiency.

In the accompanying drawing, forming a part of this specification, and in which similar numerals of reference indicate corresponding parts in all the figures of the drawing.

The improved sustaining wing or foil, forming the subject-matter of the present invention, comprises a plurality of tubular members 5 gradually decreasing in height so that, when said tubular members are assembled in a horizontal plane, they will have the general outline or delineation of a sustaining wing. The tubular members 5 are preferably formed of superposed rubber impregnated wood veneer strips and, when said tubular members are assembled, the adjacent faces thereof will closely adhere and be elastically bonded together. Entirely surrounding and encasing the assembled tubular members 5 is a reinforcing jacket 6 preferably formed of a continuous strip of rubber impregnated wood veneer, although, if desired, mechanical cloth or other suitable material may be employed in lieu thereof. This wood veneer strip follows the general contour of the tubular members 5 and is caused to closely adhere thereto and to be elastically bonded therewith, preferably by subjecting the same to a vulcanizing process.

One end of the wood veneer, constituting the jacket 6 at the trailing edge of the wing, is extended longitudinally beyond the other end 7 to form an integral flexible aileron, indicated at 8, and this aileron may extend for any desired distance in the length and width of the plane.

Figure 1:
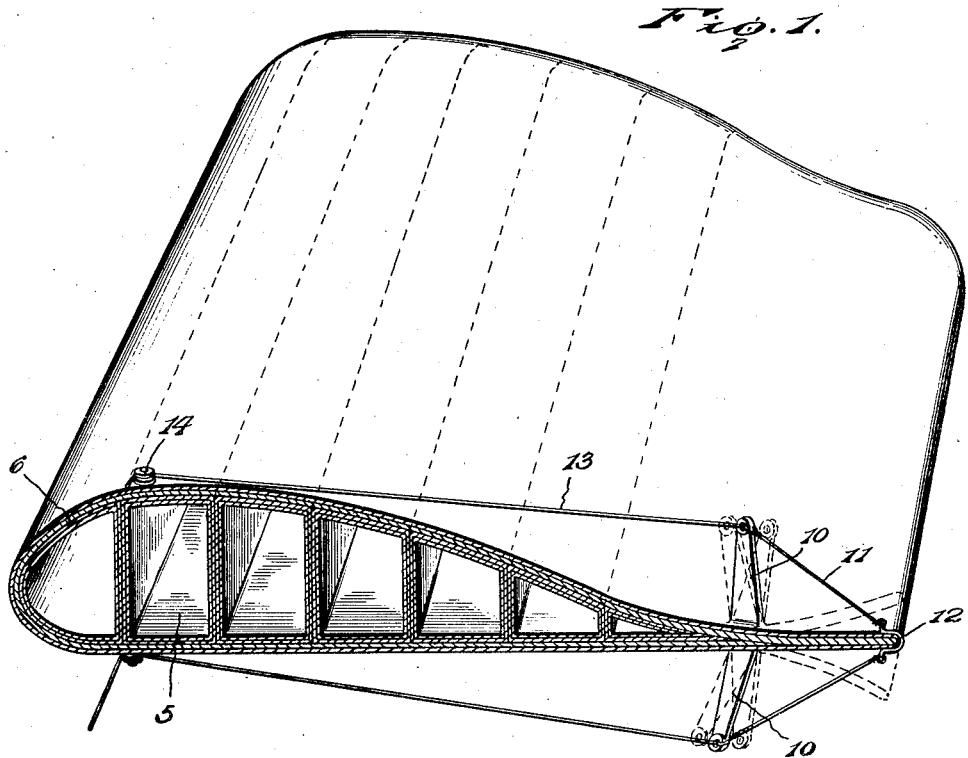
Figure 1 is a sectional perspective view of an aeroplane wing constructed in accordance with the present invention, showing in dotted lines the flexing action of the trailing edge.
Figure 2:
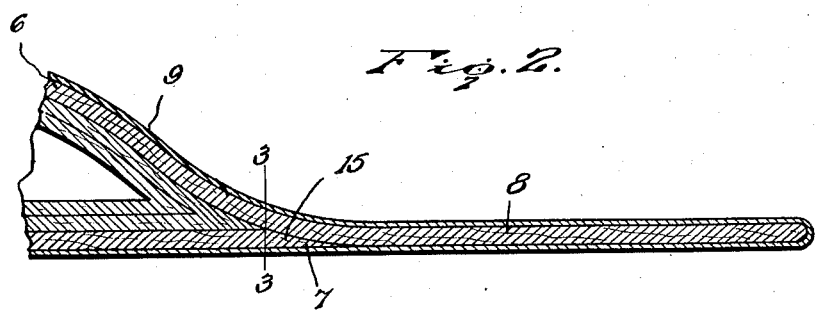
Figure 2 is a detail sectional view of the trailing edge and adjacent portion of the wing.
Figure 3:
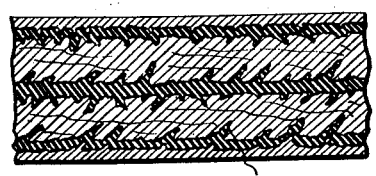
Figure 3 is an enlarged detail sectional view taken on the line 3—3 of Figure 2 showing the bonding action between the wood and rubber.

The surface of the reinforcing jacket 6, as well as the surface of the aileron 8, may, if desired, be covered with an acetone solution 9 containing preferably approximately five percent, by weight, of solid cellulosic plastic material and this covering 9 when used provides a smooth exterior finish for the wing and aileron carried thereby. Projecting from opposite sides of the aileron 8 and anchored thereto in any suitable manner are uprights or braces 10 and secured to the outer ends of said braces are stay wires 11 fastened to a clip 12 on the outer end of the aileron. Controlling wires 13 are also secured to the outer ends of the braces 10 and extend over pulleys 14 to the controls of the machine so that the operator, by actuating said controls, may flex the trailing edge or aileron 8 either downwardly or upwardly, as indicated by dotted lines in Figure 1 of the drawing. Any other desired means, however, may be employed for flexing the trailing edge or aileron and I, therefore, do not desire to be limited to the specific means herein shown and described. The end 7 of the veneer, constituting the jacket 6, is inclined or beveled at 15 so as to conform to the curvature of the aileron at its junction with the body of the wing and thus produce a smooth unobstructed surface on the bottom of the plane and assist in preventing breakage of the aileron when flexed.

During the vulcanizing operation, the rubber will be forced into the interstices of the wood, as indicated at 16, so as to strengthen the trailing edge and jacket and form a firm bonding action between the laminations comprising the tubular members 5, while the covering 9 of cellulosic plastic material will fill or cover any cracks or crevices and flow evenly over the entire surface of the wing and aileron so as to produce a smooth exterior finish, as previously stated.

If desired, however, the coating of cellulosic plastic material may be omitted and in which case the flexibility of the trailing edge of the wing will be increased.

While it is preferred to impregnate the wood veneer strips of which the tubular members 5 and reinforcing jacket 6 are formed with rubber, in certain cases and under certain conditions, the rubber may be omitted and the cellulosic material applied directly to the wood veneer and I therefore do not desire to limit the invention in this respect.

The member 8 is primarily intended as an aileron but, it will, of course, be understood that, if desired, said member may extend the entire length of the wing and be used as an elevator, the salient feature of the invention residing in the integral formation of the member 8 and body of the wing which permits free flexing of said member under all conditions of service. It will also be understood that the extension on the trailing edge of the wing may be used in connection with any style of wing or any style of aircraft, such as biplanes, monoplanes, hydroplanes and amphibians.

Having thus described the invention, I claim:

1. A sustaining wing for aircraft comprising a cellular body, a laminated casing enclosing the body and having one end thereof extended longitudinally at the trailing edge of the wing to form a flexible aileron, braces secured to the opposite sides of the extension, wires connecting the braces and the free end of the extension, and means connected with said braces and operable from the controls of the aeroplane for flexing said trailing edge.

2. A sustaining wing for aircraft including a cellular structure, and a wood veneer casing enclosing the cellular structure and having one end thereof projected longitudinally at the trailing edge of the wing to form a flexible extension constituting an aileron.

3. A sustaining wing for aircraft including a cellular body portion, a casing enclosing the body portion and formed of rubber impregnated wood veneer intimately connected with and bonded to the body portion, the casing at the trailing edge of the wing being projected longitudinally to form a flexible extension, and a coating of cellulosic plastic material covering the casing and said extension and forming an exterior finish for the wing.

4. A sustaining wing for aircraft including a cellular body portion, a jacket of rubber impregnated material entirely surrounding the body portion, one end of the material constituting the jacket being beveled and the other end thereof extending longitudinally beyond said beveled portion to form a flexible extension at the trailing edge of the wing.

5. A sustaining wing for aircraft formed of a plurality of laminated tubular members arranged side by side in intimate bonding contact and having the general outline of an aeroplane wing, a jacket entirely surrounding and enclosing said tubular members and formed of rubber impregnated material elastically bonded to the tubular members, one end of the material constituting the jacket being projected longitudinally at the trailing edge of the wing to form an integral flexible extension, and a coating of cellulosic plastic material intimately combined with the rubber impregnated material and entirely covering the jacket and said extension to form an exterior finish.

6. A sustaining wing for aircraft including a body having vertical partitions connecting the upper and lower surfaces of the wing and defining independent air compartments, said body being provided with a flexible extension at the trailing edge thereof constituting an aileron, and means connected with said extension and operable from the controls of an aeroplane for flexing the same.

7. A sustaining wing for aircraft including a cellular structure, a casing enclosing the cellular structure and projecting longitudinally at the trailing edge of the wing to form a flexible extension constituting an aileron, and a jacket of cellulosic plastic material covering said casing and trailing edge and intimately connected with and bonded thereto.

8. A sustaining wing for aircraft including a body portion having a flexible extension at the trailing edge thereof and constituting an aileron, a casing enclosing the body portion, and a jacket of cellulosic plastic material covering the casing and intimately connected with and bonded thereto.

HARRY N. ATWOOD.